CIRCUIT FOR SUPPRESSING NOISE WHEN SWITCHING BETWEEN VARIOUS A-C SOURCES SUPERIMPOSED ON DIFFERENT D-C BIASES

Filed Sept. 14, 1964 3 Sheets-Sheet 1

INVENTOR
JANOS T. BARANY
BY
Douglas M. Clarkson
ATTORNEY

INVENTOR
JANOS T. BARANY
BY
Douglas M. Clarkson
ATTORNEY

INVENTOR
JANOS T. BARANY
BY
Douglas M. Clarkson
ATTORNEY

United States Patent Office 3,350,573

Patented Oct. 31, 1967

3,350,573

CIRCUIT FOR SUPPRESSING NOISE WHEN SWITCHING BETWEEN VARIOUS A-C SOURCES SUPERIMPOSED ON DIFFERENT D-C BIASES

Janos T. Barany, Rego Park, N.Y., assignor to Potter Instrument Company, Inc., Plainview, N.Y., a corporation of New York Filed Sept. 14, 1964, Ser. No. 396,056
8 Claims. (Cl. 307—88.5)

ABSTRACT OF THE DISCLOSURE

The resistor of a RC coupling network for coupling A-C signal sources to an amplifier is short circuited during switching in order to suppress noise signals when switching between various A-C signal sources superimposed on different D-C bias levels.

This invention, generally, relates to pedestal suppressing circuits and, more particularly, relates to a circuit for the elimination of abrupt changes in the voltage level of a direct current in a composite signal having both direct and alternating current components.

In many instances, electrical signals are derived in such a manner that the desired A-C (alternating current) information signal is superimposed upon a D-C (direct current) voltage level, the amplitude of the D-C being subject to abrupt and often wide amplitude variations. For example, in computer technology, it is common to drive the computer from a plurality of signal sources, such as magnetic tape recorders (tape transports) which are engaged selectively in a time-sharing sequence in accordance with the demand of the computer.

With such an arrangement, the A-C information signal is superimposed upon a D-C voltage level. The D-C level, however, is subject to relatively wide variations in amplitude as the computer switches from one transport to another. Thus, the composite wave form consists of the A-C signal superimposed on voltage "pedestals" of varying amplitude.

The commonly used method of capacitor blocking of the D-C signal cannot be employed to eliminate the D-C component because of the abruptness of the change between these voltage pedestals. Instead of eliminating the D-C signal, the sharp discontinuity in the D-C signal causes a time-varying signal corresponding to the decay of the capacitor charge over a time determined by the circuit time constant.

It is, therefore, a primary object of the present invention to provide improved circuitry for the elimination of long transition intervals between changes in pedestals in a composite signal of superimposed A-C and D-C signals.

Another object of the invention is to provide a circuit for shaping an electrical signal for decreasing the transient time during abrupt changes in D-C voltage levels.

In accordance with this object, there is provided, in a preferred embodiment of this invention, a signal source generating the composite signal of an A-C signal superimposed upon a D-C voltage level or "pedestal." A capacitor and a resistor are coupled serially between the output of the source and ground. A switching circuit is coupled in parallel with the resistor. The output for subsequent processing of the signal is derived from a junction between the capacitor and the resistor.

At each discontinuity of the D-C level, the switching circuit is closed, locking the junction between the capacitor and the resistor to ground, thereby forcing the source to charge the capacitor. Thus, the junction at the D-C level of the composite signal are locked to ground, eliminating pedestal variations in the output signal. The switching circuit is closed only during the transition between pedestal steps as, for example, by keying the switch to the selector network selecting one of a plurality of tape transports and is opened immediately thereafter to prevent loss of the A-C information signal.

A second isolating capacitor and dropping resistor may be coupled between the junction and ground if desired, and the A-C signal then would be obtained from the junction between said second capacitor and said second resistor.

While the switching circuit may include electrical components such as transistors to lock the junction to ground during the switching from transport to transport, mechanical switches, such as relays, may be included also if desired, dependent upon the application intended.

The residual signal derived from the switching characteristics of a transistor may be maintained sufficiently low with respect to the A-C signal so as to be negligible. This is an advantage since the residual signal amplitude is dependent upon the characteristics of the transistors used and is not dependent upon the relative magnitude of the voltage pedestals. Thus, the composite signal amplification can be controlled to render the residual signal negligible.

Having briefly described this invention, it will be described in greater detail along with other objects and advantages in the following portions of the specifications, which may best be understood by reference to the accompanying drawings, in which.

Figure 1:
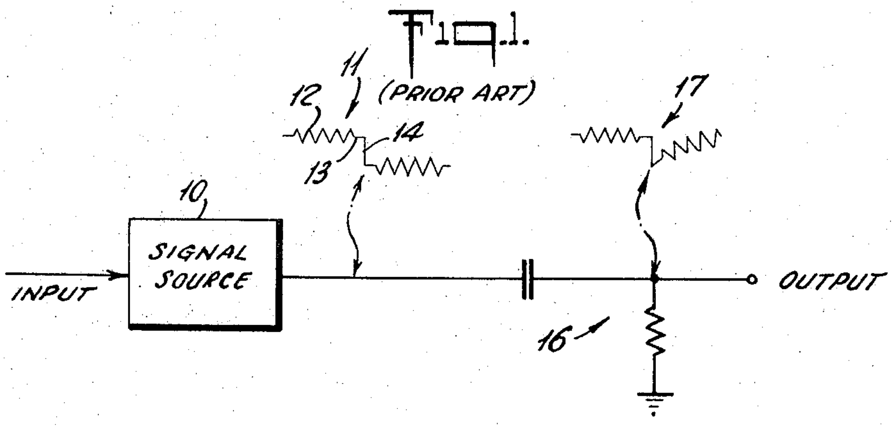
FIG. 1 is a schematic diagram of a circuit which is typical of the prior art and which is useful in the explanation of the present invention.

In FIG. 1, which is representative of the prior art and useful for explanatory purposes, there is shown a signal source 10 which, in response to a suitable input, generates the signal wave form 11 consisting of an A-C signal 12 superimposed on a D-C pedestal voltage 13 having abrupt changes as at 14. Thus, the A-C signal is carried on pedestals of various D-C levels.

A typical use of this circuit is found in the computer field where a plurality of tape transports are read selectively in a time-sharing sequence in accordance with demand signals issued by the computer. In other fields also, it is normal to amplify low level signals by a D-C amplifier (which may be the circuit 10) so as to amplify both the A-C signals and the D-C pedestals without deterioration.

However, in most instances, it is necessary to amplify the A-C information-representing signal further, which is more easily accomplished by A-C amplifiers if the signal is to be brought up to higher amplitudes. In order to use A-C amplifiers, however, the discontinuities in the D-C level must be eliminated.

Elimination of the D-C component cannot be accomplished by a conventional isolating capacitor and bypass resistor network 16, and the decay time of this RC network would distort the signal as shown in wave form 17, introducing an erroneous information signal.

Figure 2:
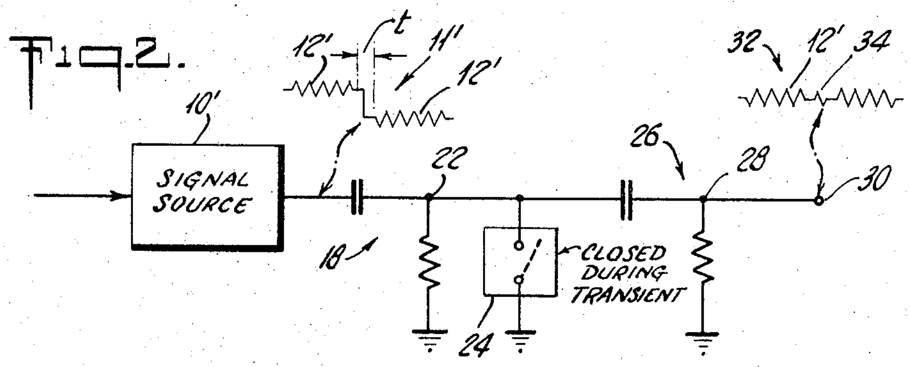
FIG. 2 is a schematic diagram of one embodiment of the present invention.

In accordance with the present invention as shown in FIG. 2, the source 10′ generates the composite signal shown in wave form 11′. A serially connected capacitor and resistor network 18 is coupled between the output of the signal source 10′ and ground. A switch circuit 24 is coupled between the junction 22 and ground. A second serially connected capacitor and resistor network 26 is provided, and the output signal is applied to a terminal 30 from the junction 28.

The switch circuit 24 may include tubes or transistors or it may include a relay to provide actual mechanical switch contacts. In any event, the switch circuit 24 is energized to close at a discontinuity in the D-C pedestal level and is closed for the short time interval indicated as "$t$" in wave form 11′. Thus, the switch is closed only during transitions of the D-C wave form and does not influence the A-C information-representing signal 12′ on each pedestal.

Absent the switch 24, the time required to reach a steady state voltage after a change will depend on the time constant of the capacitor and resistor network 18.

However, with the switch circuit 24 closed during a discontinuity, the junction 22 will be held at 0 volt, forcing the D-C signal source 10′ to charge the capacitor to a value resultant from the change in the D-C signal level. That is, the source 10′ is forced to supply a charge to the capacitor to compensate for changes in the pedestal height.

Therefore, the resultant signal is an A-C signal at a single D-C level, which D-C level may be removed by the capacitor in the network 26 to provide the wave form 32 which permits the A-C wave form 12′ to be maintained at a constant D-C level. If the switch contacts have any resistance, a small residual "pip" 34 may be noted at the position of the pedestal discontinuity.

In the case of a computer having a plurality of transports connected to furnish stored information as called for, the switch circuit 24 may be energized by the same command signal that changes transports. In the normal case, the command signal is applied to the switch, closing switch circuit 24, and to the transport through a delay network. A fixed delay then is introduced as the transport comes up to speed overcoming its mechanical inertia. The switch circuit 24 may be opened at any time prior to the initiation of the information signal from the transport. This delay may be predetermined and, thus, fixed or programmed in response to the existence of an information signal.

Figure 3:
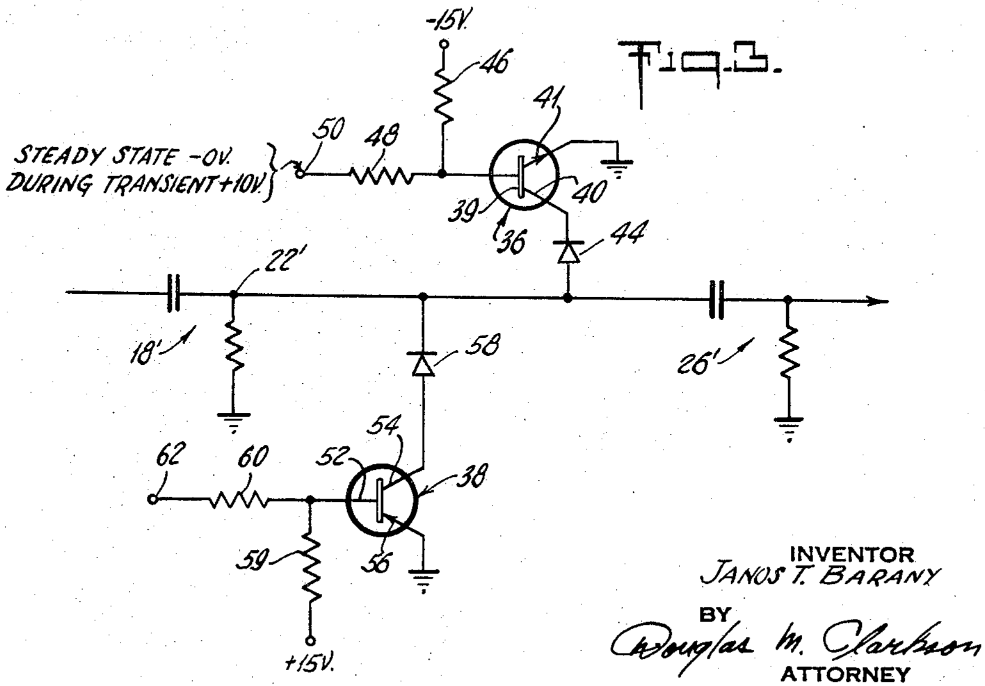
FIG. 3 is a schematic diagram of another embodiment of the present invention.

In many instances, it is desired to improve the speed of response of the circuit shown in FIG. 2, and therefore, the embodiment shown in FIG. 3 may be employed advantageously.

In FIG. 3, there is shown a circuit for the reduction of pedestal steps in a composite signal which is similar to that in FIG. 2 and in which like parts have been identified by the same numerals.

In FIG. 3, there is shown the capacitor and resistor network 18′ having the same operation on a composite signal as the like network shown in FIG. 2. However, to clamp the junction 22′ during changes in pedestal height, there is provided a first transistor 36 and a second transistor 38.

The transistor 36 is provided with base, collector and emitter electrodes 39, 40 and 41, respectively. The emitter electrode 41 is grounded, and the collector electrode 40 is coupled to the same line as the junction 22′ through a diode 44. The base electrode 39 is coupled to a bias voltage source of −15 volts by resistor 46. The base electrode 39 also is coupled through a resistor 48 to a variable bias voltage source (not shown) at a terminal 50 for controlling the conduction of the transistor 36 in reducing the pedestal steps.

In operation, the steady state signal applied to the terminal 50 is 0 volt. The voltage drop through the resistor 46 connected to the base electrode 39 is switched to cut off the transistor 36, providing a high impedance path between the collector and emitter electrodes. Thus, during these conditions, the A-C signal is not reduced by loading caused by the transistor 36.

However, before switching of a source of a composite signal as, for example, switching between tape transports, the terminal 50 is biased with a +10 volt pulse to drive the transistor 36 into saturation and, thus, to create a low impedance path locking the junction 22 to ground during the transition. The source drives the capacitor 18 during the change in pedestal height. Before the A-C signal is applied, the transistor 36 is again returned to the cut-off state so as to have no influence on the passage of the A-C signal.

The transistor 36 is capable of only handling positive-going transients on the junction 22. Therefore, the transistor 38 is provided to handle the negative-going transients.

The transistor 38 is similarly provided with a base, collector and emitter electrodes 52, 54 and 56 respectively. The emitter electrode 56 is grounded, and the collector electrode 54 is coupled through a diode 58 to the same line as the junction 22. The base electrode 52 is coupled to a positive bias source of +15 volts by resistor 59 and also to a switch control bias source (not shown) at terminal 62 through a resistor 60.

The diodes 44 and 58 can be eliminated by keeping the impedance of the base bias network of the transistors 36 and 38 high in relation to the output impedance of the signal source.

The variable bias applied to the terminal 62 is 0 volt for the steady state condition which maintains the transistor 38 at the cut-off state, providing a high impedance path between the junction 22 and ground for reducing the pedestal. However, a biasing pulse of −10 volts is applied to the terminal 62 during pedestal transitions to drive the transistor 38 into saturation, clamping the junction 22 to ground with respect to a negative-going transient.

As explained in connection with the switching circuit of FIG. 2, the biasing signals driving the transistors may be derived from the control signals of the computer which energizes the respective tape transports. The most convenient way is to delay the signal to the transport applying signals for transistor bias immediately upon generation. Thus, the transistors are clamped when the transports are energized and are held clamped for the time interval of the transient, being released from the clamped condition prior to the generation of the A-C signal.

The usual delay in A-C signal generation as the transport comes up to speed is sufficient to provide adequate time periods for operation of the clamping transistors.

Sometimes, a small residual signal may appear in the A-C signal. However, the magnitude of the residual signal is dependent only on the transistor characteristics which are fixed and, thus, the relative magnitude with respect to the A-C information-representing signal may be controlled to be quite low. Thus, the amplification of the composite signal prior to the reduction of the pedestal can be achieved so that the relative amplitude of the A-C signal is of the order of 10 to 1 with regard to the residual signal, rendering the residual signal negligible.

Figure 4:
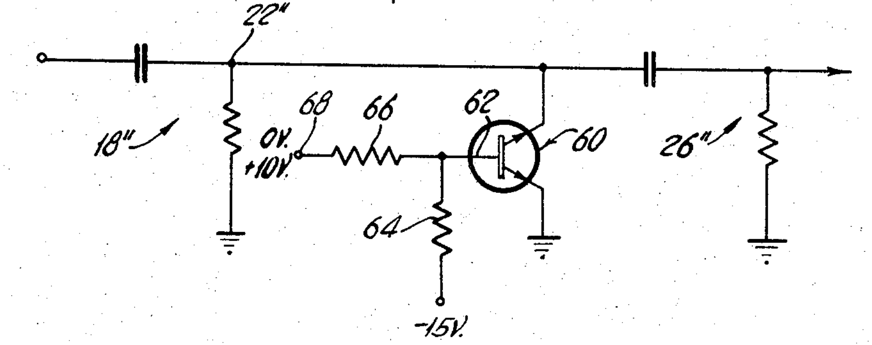
FIG. 4 is a schematic diagram of still another embodiment of the present invention.

Alternately, a bipolar transistor may be utilized as is shown in FIG. 4, where the bipolar transistor 60 is coupled between the junction 22″ and ground. The base electrode 62 thereof is coupled to a negative bias source through a resistor 64 and to a variable source (not shown) through a resistor 66.

The signal applied to the terminal 68 is zero for the steady state condition and is +10 volts during the transients to clamp the junction 22 to ground. The bipolar transistor 60 will clamp both the positive and the negative-going signals with only a slight increase in the residual signal level, which can be compensated for, as explained above.

When the number of transports is reasonably low, it is possible to select the signal from the transports by an input selector circuit. However, when the number of transports becomes large, selection of the signal by a single input selector circuit becomes difficult and often impossible in practice due to the difficulties of cabling and signal interactions if long cable lengths are used and, more important, due to a prohibitive increase in the cost of the necessary circuitry.

In such instances as, for example, in a typical installation utilizing sixteen transports to feed information into a single computer, it would be desirable to subdivide the transports into more easily handled subdivisions. Although input selector circuits could be utilized for source selection of subdivided sources, the required channels for processing the subdivisions introduce practical limitations during recombination, caused by amplifier noise and other sources of spurious signals.

However, by utilizing the present invention, a selector network can be formed for the selection of one of a great number of input signals, and the selected signal can be connected to a single processing amplifier. Such a network includes a selector circuit for a subdivision of the plurality of input signals, and each of the selector circuits has an input selector to select the desired input signal from the subdivision of the plurality of signals.

The selected signal is amplified and coupled to an output selector network. Each output selector network has isolating stages to isolate the nonselected signal and to apply the selected signal to the base electrode of a transistor in the output selector signal. The respective output selector circuits are coupled together by coupling each emitter electrode to a common output terminal which is biased by the application of a bias source through a dropping resistor.

When the selected signal is applied to any one transistor, the conduction of that transistor will change the bias on the output terminal to back bias the remaining transistors, preventing the transmission of any signal therethrough. Thus, the output selector circuit positively cuts off the amplifier circuitry from the output terminal, preventing the transmission of noise or other spurious signals to the utilizing equipment.

Since the magnetic heads have differing response characteristics, the output selector circuit is provided with compensator circuits to equalize the output signal level despite variation in input signal level caused by the differing response characteristics. For this purpose, there is provided an output selector circuit having a common input terminal and a plurality of selector terminals.

Between the common input terminal and each of the selector terminals, there is serially coupled a diode and a potentiometer having a variable tap position. The transistor of the output selector circuit is provided with base, collector and emitter electrodes, and each tap of the potentiometers is coupled to the base electrode, which electrode is also coupled to a bias source.

The emitter electrode similarly is coupled to the bias source, and the collector electrode is coupled to ground. The emitter electrode also is coupled to a common output terminal, which is itself coupled to the bias source. Thus, each selector input signal will be transmitted through the transistor to the output terminal, and the relative amplitude of the signal can be adjusted to equalize signals between heads of differing response characteristics by movement of the position of the tap electrode on the respective potentiometers.

Figure 5:
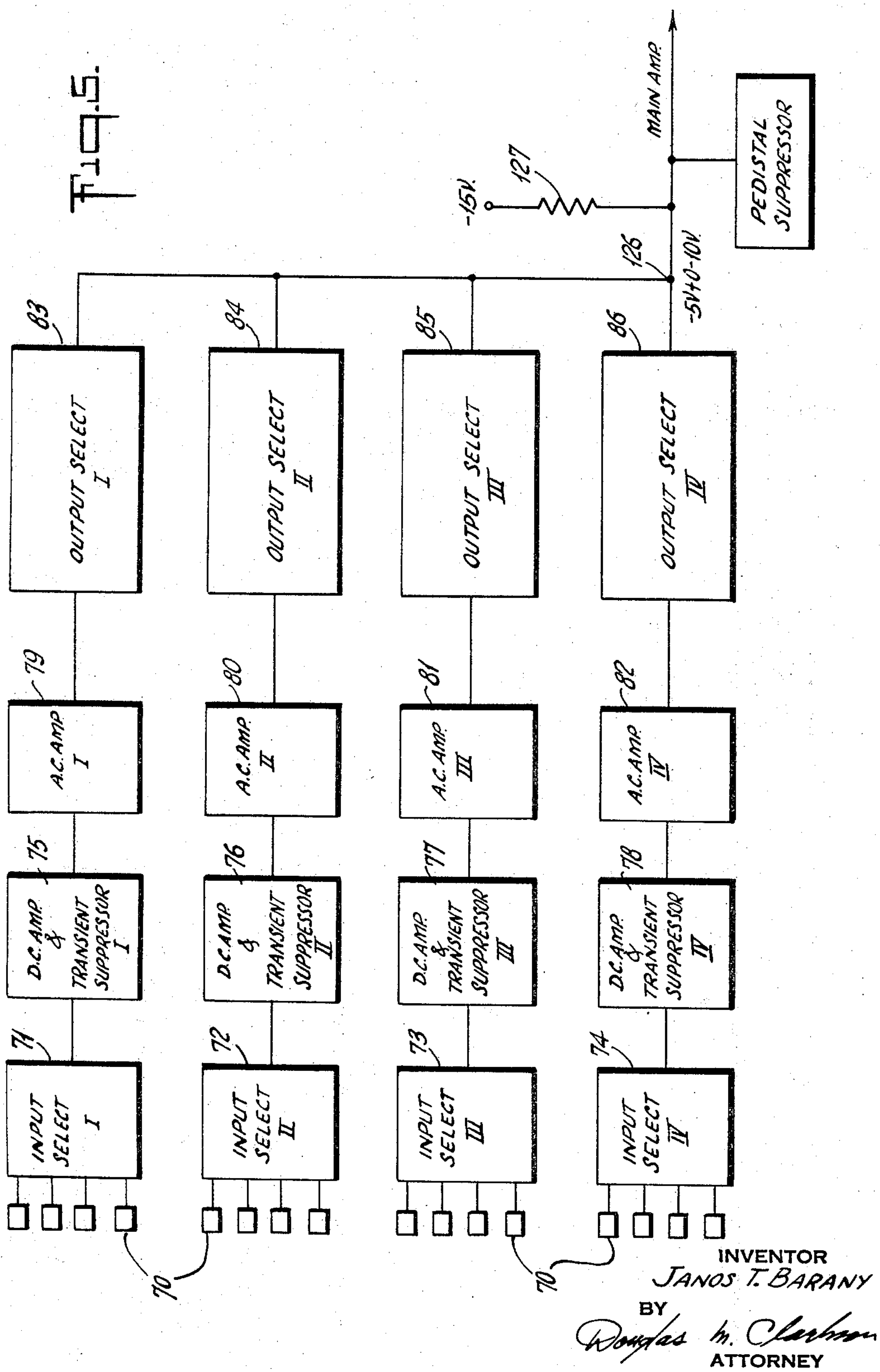
FIG. 5 is a schematic diagram of a selector network which is possible with the circuit of the present invention.

In FIG. 5, there is shown a plurality of input sources 70. These sources, of which sixteen are illustrated, may be tape transports for the selective feeding of information stored on magnetic tape to a central computer on a time-sharing basis in accordance with the demand requirements of and actuated by the computer. The input sources are divided into a convenient subdivision of the plurality of input sources as, for example, the subdivision into groups of four illustrated. It will be recognized that the total number of transports or the subdivision may be varied in accordance with the demands of the individual installation without departing, however, from the spirit and scope of this invention.

Each group of sources 70 is coupled to a respective input select circuit 71, 72, 73 and 74. The select circuit selects the desired input signal in accordance with the instructions given by the computer.

The selected signal then is amplified by one of the respective D-C amplifier signal sources 75, 76, 77 and 78, and transients such as pedestal discontinuities are removed. The signal then is further amplified by the respective A-C amplifiers 79, 80, 81 and 82. The output selector circuits are schematically illustrated by numerals 83, 84, 85 and 86.

Figure 6:
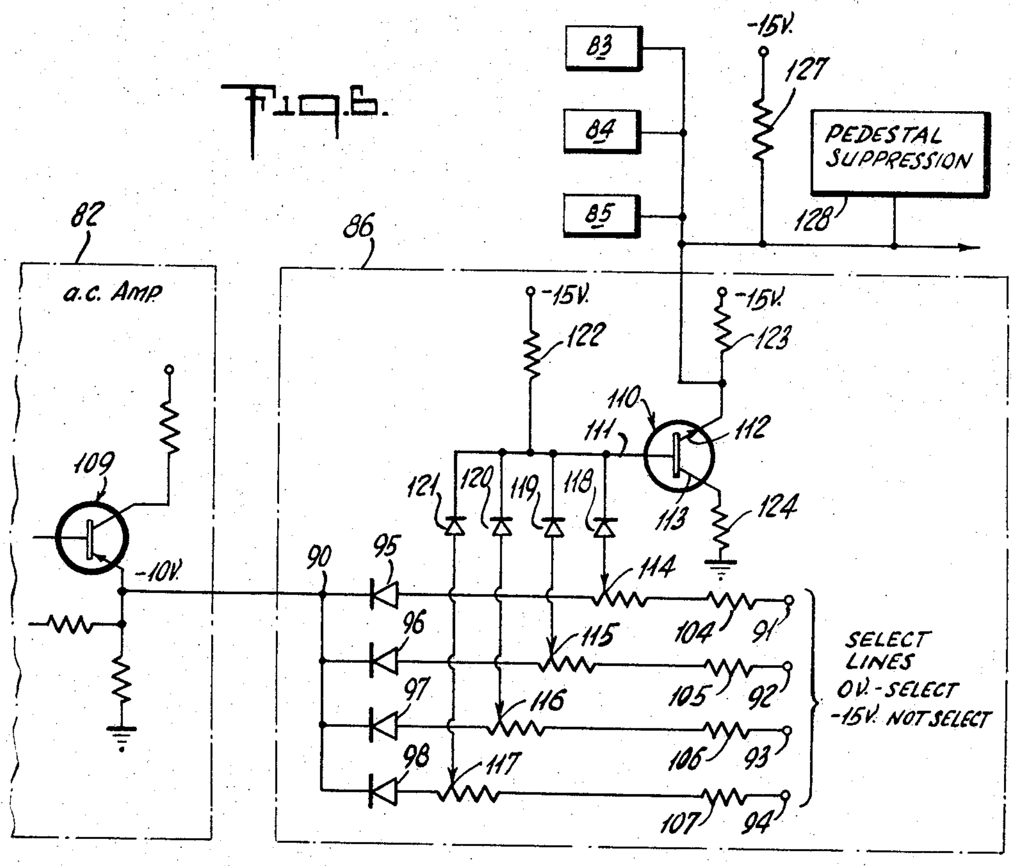
FIG. 6 is an illustrative arrangement of one component of the diagram shown in FIG. 5.

The output selector circuit shown in FIG. 6 is typical of each illustrated in FIG. 5 and includes an input terminal 90 and selector terminals 91, 92, 93 and 94. Diodes 95, 96, 97 and 98 are coupled between each selector terminal and the common input terminal 90 with all of the anodes coupled together to the input terminal 90 and the cathodes coupled to the respective selector terminals 91, 92, 93 and 94 through respective potentiometers 100, 101, 102 and 103, and optional series resistor 104, 105, 106 and 107, respectively.

The quiescent bias on the emitter 108 of the transistor 109 of the A-C amplifier is of the order of −10 volts. The bias applied to each selector terminal is −15 volts for the nonselected signal and 0 volt for the selected signal. Thus, for the nonselected signals, the diods 96, 97, 98, 100 are backbiased and will not pass a signal. For the selected signal, the diode is forward biased and will permit the selected signal appearing at the common input to pass through the selected potentiometer.

Each output selector circuit is provided with a transistor 110 having a base, emitter and collector electrodes numbered 111, 112 and 113, respectively. The tap electrodes 114, 115, 116 and 117 of potentiometers are coupled, through a respective diode 118, 119, 120 and 121 to the base electrode 111 of the transistor 110, which is also coupled through resistor 122 to a bias source of −15 volts for the NPN transistor illustrated.

The emitter electrode 112 is similarly coupled through resistor 123 to the same bias source and the collector electrode 112 is coupled through a resistor 124 to ground. Each emitter is coupled through a lead 125 to a common output terminal 126 which is also coupled to the bias source through a resistor 127.

The output terminal 126 is coupled to the main amplifier and should have a pedestal suppression network 128 for the elimination of pedestal discontinuities.

In operation, therefore, when the selected signal passes through its respective potentiometer, it will be applied to the base electrode 111 of the output transistor 110, causing the transistor 110 to conduct and applying the signal to the output terminal 126. This will drop the output terminal potential in the range of −5 to −10 volts thereby dropping (or increasing positively) the emitter potential of each of the other transistors in the output selector circuits below the applied base electrode potential and thereby cutting off each of the nonselected transistors (i.e. the base is negative with respect to the emitter).

Thus, no spurious signal can be passed by the output selector stages since the stages of each channel are cut off except for the channel used for passage of a signal. The variation in the response characteristics of the magnetic heads can be easily compensated for by movement of the tap position of the respective potentiometers, thereby to equalize the magnitude of the output signal despite the variation of response characteristics between the various heads.

This invention may be variously modified and embodied within the scope of the subjoined claims.

What is claimed is:

1. A wave shaping circuit to separate the A-C signal from a composite signal consisting of said A-C signal superimposed on a changing D-C signal pedestals comprising:
   a capacitor having a first and a second terminal,
   a resistor having a first and a second terminal,
   said capacitor and resistor being coupled serially by connecting said respective first terminals at a junction,
   a plurality of transducers producing a low level alternating current output signal superimposed on various different D.C. pedestals,
   means for selectively decoupling one of said output signals from said second terminal of said capacitor and coupling another one of said output signals thereto,
   means for applying a reference source to said second terminal of said resistor, and
   means for clamping said junction to said reference terminal during the decoupling of said one signal and the coupling of said other signal only.

2. A wave shaping circuit in accordance with claim 1 in which said means for clamping said junction comprises:
   a switch coupled between said junction and said reference terminal including means for closing said switch only during the decoupling of said one signal and the coupling of said other signal.

3. A wave shaping circuit in accordance with claim 1 in which said clamping means is:
   an NPN transistor having base, collector and emitter electrodes,
   means coupling said collector electrode to said junction,
   means coupling said emitter electrode to said reference source, and
   said base electrode being coupled to a biasing source,
   so that said bias source cutting said transistor off during passage of said A-C signal and driving said transistor into saturation during the decoupling of said one signal and the coupling of said other signal.

4. A wave shaping circuit in accordance with claim 3 in which:
   said means coupling said junction to said collector electrode includes a diode having anode and cathode electrodes, and
   means coupling said cathode electrode to said junction and said anode to said collector electrode.

5. A wave shaping circuit in accordance with claim 3 which includes:

a PNP transistor having a base, collector and emitter electrodes,
   means coupling said collector electrode to said junction,
   means coupling said emitter electrode to said reference source, and
   means coupling said base electrode to the biasing signal to cut off said transistor during passage of said A-C signal and to drive said transistor into saturation during the decoupling of said one signal and the coupling of said other signal.

6. A wave shaping circuit in accordance with claim 5 in which said means for coupling said collector electrode to said junction includes:
   a diode having a cathode and anode electrodes,
   means coupling said anode electrode to said junction, and
   means coupling said cathode electrode to said collector electrode.

7. A wave shaping circuit in accordance with claim 1 in which said clamping means includes:
   a bipolar transistor having a base, emitter and collector electrodes,
   means coupling said emitter electrode to said reference source,
   means coupling said collector electrode to said junction, and
   means coupling said base electrode to a bias source to cut off said transistor during passage of said A-C signal and to drive said transistor into a conductive state during the decoupling of said one signal and the coupling of said other signal.

8. A wave shaping circuit in accordance with claim 1 which includes:
   a second capacitor and a second resistor serially coupled between said junction and ground, and
   means to derive an output signal from the junction between said second capacitor and resistor.

References Cited

UNITED STATES PATENTS

| | | | |
|---|---|---|---|
| 2,994,044 | 7/1961 | Straube | 307—88.5 X |
| 3,025,418 | 3/1962 | Brahm | 307—88.5 |
| 3,071,651 | 1/1963 | Frankel | 307—88.5 X |
| 3,095,511 | 6/1963 | Maestre | 307—88.5 |
| 3,146,400 | 8/1964 | Perlman | 307—88.5 X |

OTHER REFERENCES

Burton, "A Transistor D.C. Chopper Amplifier," Electronic Engineering (Mag.), August 1957. (pp. 393–396).

ARTHUR GAUSS, *Primary Examiner.*

DAVID J. GALVIN, *Examiner.*

D. D. FORRER, *Assistant Examiner.*